(12) United States Patent
Goto et al.

(10) Patent No.: US 9,169,951 B2
(45) Date of Patent: Oct. 27, 2015

(54) TUBULAR THREADED JOINT HAVING IMPROVED LOW TEMPERATURE PERFORMANCE

(75) Inventors: Kunio Goto, Kobe (JP); Masayoshi Sasaki, Wakayama (JP)

(73) Assignees: NIPPON STEEL & SUMITOMO METAL CORPORATION, Tokyo (JP); VALLOUREC MANNESMANN OIL & GAS FRANCE, Aulnoye-Aymeries (FR)

( * ) Notice: Subject to any disclaimer, the term of this patent is extended or adjusted under 35 U.S.C. 154(b) by 205 days.

(21) Appl. No.: 13/881,446

(22) PCT Filed: Nov. 4, 2011

(86) PCT No.: PCT/JP2011/076018
§ 371 (c)(1),
(2), (4) Date: Jul. 12, 2013

(87) PCT Pub. No.: WO2012/060474
PCT Pub. Date: May 10, 2012

(65) Prior Publication Data
US 2013/0277961 A1    Oct. 24, 2013

(30) Foreign Application Priority Data

Nov. 5, 2010 (JP) ................................. 2010-248789

(51) Int. Cl.
*F16L 11/00* (2006.01)
*F16L 15/08* (2006.01)
(Continued)

(52) U.S. Cl.
CPC ................. *F16L 15/08* (2013.01); *B05D 3/007* (2013.01); *B05D 3/065* (2013.01); *C10M 169/041* (2013.01); *C10M 169/044* (2013.01); *E21B 17/042* (2013.01); *E21B 17/08* (2013.01); *F16L 15/004* (2013.01); *F16L 15/009* (2013.01); *F16L 58/182* (2013.01); *C10M 2201/041* (2013.01); *C10M 2201/05* (2013.01); *C10M 2201/062* (2013.01); *C10M 2205/022* (2013.01); *C10M 2205/0225* (2013.01); *C10M 2205/0285* (2013.01); *C10M 2205/183* (2013.01);
(Continued)

(58) Field of Classification Search
USPC ........................................... 285/94, 45, 293.1
See application file for complete search history.

(56) References Cited

U.S. PATENT DOCUMENTS

| | | | |
|---|---|---|---|
| 7,883,118 B2* | 2/2011 | Goto et al. | ...... 285/94 |
| 2006/0228505 A1* | 10/2006 | Goto et al. | ...... 428/36.9 |
| 2009/0220780 A1 | 9/2009 | Bordet et al. | |

FOREIGN PATENT DOCUMENTS

| | | |
|---|---|---|
| JP | 2007-224234 | 9/2007 |
| JP | 2008-527249 | 7/2008 |

(Continued)

*Primary Examiner* — Aaron Dunwoody
(74) *Attorney, Agent, or Firm* — Clark & Body

(57) ABSTRACT

In order to provide a tubular threaded joint constituted by a pin and a box each having threads and an unthreaded metal contact portion with excellent galling resistance and gas tightness even in extremely cold environments at −60° C. to −20° C. and rust preventing properties without using a compound grease, a thermoplastic solid lubricating coating containing low friction copolymer particles made from an acrylic-silicone copolymer and preferably further containing a solid lubricant (e.g., graphite) in a thermoplastic polymer matrix (e.g., selected from polyolefin resins and ethylene-vinyl acetate copolymer resins) is formed on the surface of the threads and unthreaded metal contact portion of a pin and/or a box.

18 Claims, 4 Drawing Sheets

(51) Int. Cl.
*C10M 169/04* (2006.01)
*E21B 17/042* (2006.01)
*E21B 17/08* (2006.01)
*F16L 15/00* (2006.01)
*F16L 58/18* (2006.01)
*B05D 3/00* (2006.01)
*B05D 3/06* (2006.01)

(52) U.S. Cl.
CPC ... *C10M2207/026* (2013.01); *C10M 2207/126* (2013.01); *C10M 2209/062* (2013.01); *C10M 2209/0625* (2013.01); *C10M 2209/084* (2013.01); *C10M 2213/00* (2013.01); *C10M 2213/06* (2013.01); *C10M 2219/044* (2013.01); *C10M 2229/02* (2013.01); *C10M 2229/043* (2013.01); *C10M 2229/048* (2013.01); *C10N 2220/021* (2013.01); *C10N 2220/082* (2013.01); *C10N 2230/06* (2013.01); *C10N 2250/12* (2013.01); *C10N 2250/14* (2013.01); *C10N 2250/141* (2013.01); *C10N 2280/00* (2013.01)

(56) References Cited

FOREIGN PATENT DOCUMENTS

| | | |
|---|---|---|
| JP | 2008-537062 | 9/2008 |
| JP | 2009-512819 | 3/2009 |
| WO | 2006/075774 | 7/2006 |
| WO | 2006/104251 | 10/2006 |
| WO | 2007/042231 | 4/2007 |
| WO | 2009/072486 | 6/2009 |
| WO | 2010/043316 | 4/2010 |

* cited by examiner

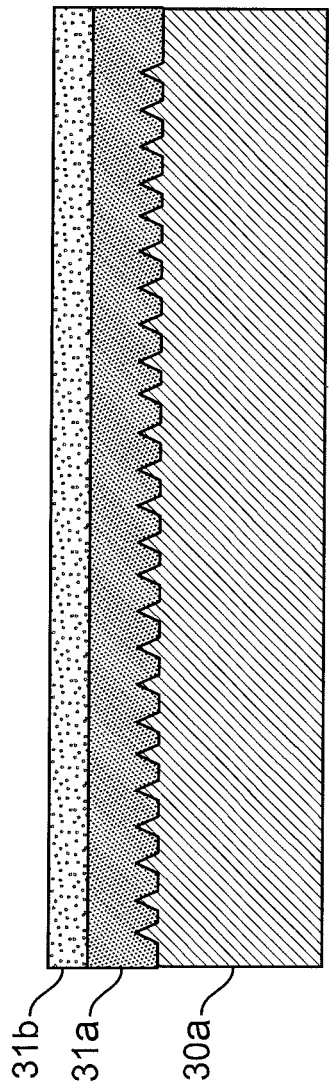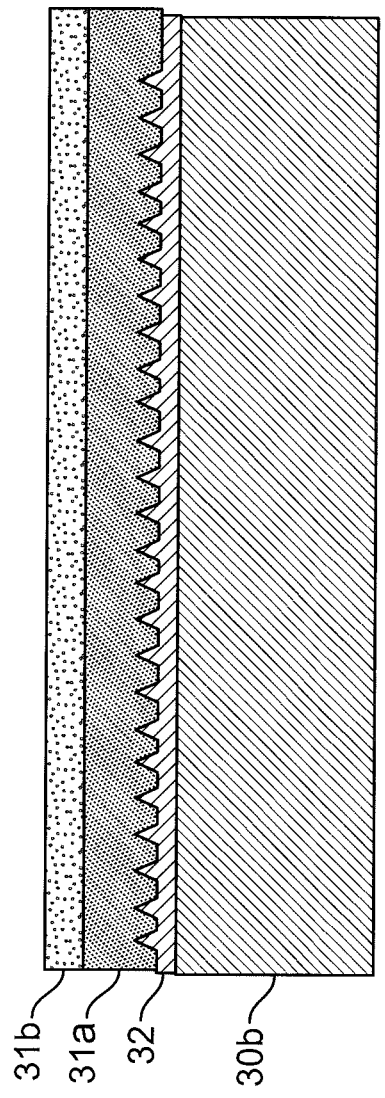

(a) Initial stage of shouldering (low pressure)

(b) Just before completion of makeup (high pressure)

TUBULAR THREADED JOINT HAVING IMPROVED LOW TEMPERATURE PERFORMANCE

TECHNICAL FIELD

This invention relates to a composition for forming a thermoplastic solid lubricating coating used for surface treatment of tubular threaded joints for connecting steel pipes and particularly oil country tubular goods, and to a tubular threaded joint having a solid lubricating coating formed from this composition. A tubular threaded joint according to the present invention can be used without application of compound grease thereto, and it can exhibit improved galling resistance and gas tightness even in an extremely low temperature environment, so it can be used for excavation of oil wells particularly in extremely cold regions.

BACKGROUND ART

Oil country tubular goods such as tubing and casing used in the excavation of oil wells for recovery of crude oil or gas oil are normally connected with each other using tubular threaded joints. In the past, the depth of oil wells was 2,000-3,000 meters, but in deep wells such as recent offshore oil fields, the depth can reach 8,000-10,000 meters. The length of an oil country tubular good is typically 10 some meters, and tubing having a fluid such as crude oil flowing in its interior is surrounded by a plurality of casings, and hence the number of oil country tubular goods which are connected together can reach a huge number of a thousand or more.

In their environment of use, tubular threaded joints for oil country tubular goods are subjected to loads in the form of tensile forces in the axial direction caused by the weight of oil country tubular goods and the joints themselves, complex pressures such as inner and outer pressures, and geothermal heat. Therefore, they must be able to guarantee gas tightness without being damaged even under such severe environments.

A typical tubular threaded joint used for connecting oil country tubular goods has a pin-box structure constituted by a member which has male (external) threads and is referred to as a pin and a member which has female (internal) threads and is referred to as a box. Typically, a pin is formed on both ends of an oil country tubular good, and a box is formed on the inner surface of both sides of a threaded joint component (a coupling).

As shown in FIG. 1, a threaded joint which has excellent gas tightness and is referred to as a special threaded joint has a seal portion and a shoulder portion (also referred to as a torque shoulder) on each of the pin and the box. The seal portion is formed on the outer periphery near the end surface closer to the end of the pin than the male threads and on the inner periphery on the base of the female threads of the box, and the shoulder portion is formed on the end surface at the end of the pin and on the corresponding rearmost portion of the box. The seal portion and the shoulder portion constitute an unthreaded metal contact portion of the pin or box of the tubular threaded joint, and the unthreaded metal contact portion and the threaded portion (male or female threads) constitute a contact surface the pin or box thereof. By inserting one end (a pin) of an oil country tubular good into a coupling (a box) and tightening the male threads of the pin and the female threads of the coupling until the shoulder portions of the pin and the box are made to abut and then interfere with a suitable torque, the seal portions of the pin and the box intimately contact each other and form a metal-to-metal seal, thereby maintaining the gas tightness of the threaded joint.

When tubing or casing is being lowered into an oil well, due to various problems, a threaded joint which was once tightened is sometimes loosened, the threaded joints are lifted out of the oil well, then they are retightened and lowered into the well. API (American Petroleum Institute) requires galling resistance so that gas tightness is maintained without the occurrence of unrepairable seizing referred to as galling even when a joint undergoes tightening (makeup) and loosening (breakout) 10 times for a joint for tubing and 3 times for a joint for casing.

In order to increase galling resistance and gas tightness when performing makeup of a threaded joint for oil country tubular goods, a viscous liquid lubricant (a lubricating grease) which is referred to as compound grease and which contains heavy metal powders is applied to a contact surface of a threaded joint (namely, to the threads and the unthreaded metal contact portion of the pin or box). Compound grease is prescribed by API Bulletin 5A2.

In the past, it has been proposed to subject a contact surface of a threaded joint to various types of surface treatment such as nitriding, various types of plating including zinc plating and composite plating, and phosphate chemical conversion treatment to form one or more layers in order to increase the retention of compound grease or improve sliding properties. However, as described below, the use of compound grease poses the threat of adverse effects on the environment and humans.

Compound grease contains a large amount of heavy metal powders such as zinc, lead, and copper powders. At the time of makeup of a threaded joint, grease to which has been applied is washed off or overflows to the exterior surface, and there is a possibility of its producing adverse effects on the environment and particularly on marine life due to harmful heavy metals such as lead. In addition, the process of applying compound grease worsens the work environment and working efficiency, and there is a concern of its toxicity towards humans.

In recent years, as a result of the enactment in 1998 of the OSPAR Convention (Oslo-Paris Convention) aimed at preventing marine pollution in the Northeast Atlantic, strict environmental restrictions are being enacted on a global scale, and in some regions, the use of compound grease is already being regulated. Accordingly, in order to avoid harmful effects on the environment and humans during the excavation of gas wells and oil wells, a demand has developed for threaded joints which can exhibit excellent galling resistance without using compound grease.

As a threaded joint which can be used for connecting oil country tubular goods without application of compound grease, the present applicants proposed in WO 2006/104251 a tubular threaded joint in which the contact surface of at least one of a pin and a box is coated with a two-layer coating having a viscous liquid or semisolid lubricating coating and a dry solid coating formed atop it. The dry solid coating can be formed from a thermosetting resin such as an acrylic resin or from an ultraviolet curing resin. The viscous liquid or semisolid lubricating coating has tackiness so that foreign matter easily adheres thereto, but by forming a dry solid coating atop it, the tackiness is eliminated. Since the dry solid coating is destroyed at the time of makeup of a threaded joint, it does not interfere with the lubricating properties of the lubricating coating disposed beneath it.

In WO 2007/42231, the present applicants disclosed a threaded joint having a thin lubricating coating without tackiness which contains solid lubricant particles dispersed in a solid matrix exhibiting plastic or viscoplastic rheological behavior (flow properties) on the threads (of a pin and a box). The matrix preferably has a melting point in the range of 80-320° C., and it is formed by spray coating in a molten state (hot melt spraying), by flame coating of powder, or by spray coating of an aqueous emulsion. A composition used in the hot melt method contains, for example, polyethylene as a thermoplastic polymer, wax (such as carnauba wax) and a metal soap (such as zinc stearate) as a lubricating component, and calcium sulfonate as a corrosion inhibitor.

In WO 2006/75774, the present applicants described a tubular threaded joint in which the contact surface of at least one of a pin and a box is coated with a two-layer coating comprising a solid lubricating coating comprising a lubricating powder and a binder, and a solid corrosion-preventing coating which does not contain solid particles formed atop the solid lubricating coating.

Patent Document 1: WO 2006/104251
Patent Document 2: WO 2007/42231
Patent Document 3: WO 2006/75774

SUMMARY OF THE INVENTION

The tubular threaded joints described in above-mentioned Patent Documents 1-3 exhibit excellent adhesion and sliding properties of the solid lubricating coating and sufficient galling resistance in cold to warm environments from around −10° C. to around +50° C. However, when it is exposed to an extremely cold environment from −60° C. to −20° C., peeling of the solid lubricating coating due to a decrease in adhesion and the occurrence of cracking due to embrittlement of the coating easily occur. Furthermore, if makeup and breakout of a threaded joint are carried out at such low temperatures, the torque becomes extremely high and the number of times that connection can be performed as an index of galling resistance becomes inadequate.

The object of the present invention is to provide a tubular threaded joint which suppresses the formation of rust and exhibits excellent galling resistance and gas tightness without using compound grease even in an extremely cold environment and which does not have a tacky surface.

As a result of studies aiming at realizing sufficient galling resistance, rust resistance, and gas tightness without an extreme increase in the makeup and breakout torques of a threaded joint even when it is used not only in cold, warm and tropical regions where the air temperature is around −20° C. to around +50° C. but also in extremely cold regions at −60° C. to −20° C., the present inventors made the following findings.

1) A thermoplastic lubricating coating containing particular copolymer particles such as acrylic-silicone copolymer particles in a thermoplastic polymer matrix is effective.

2) Galling resistance is further improved when a coating contains a solid lubricant in addition to the copolymer particles.

3) A polyolefin resin or an ethylene-vinyl acetate copolymer resin is preferable as a thermoplastic polymer which serves as a matrix (base material) of the coating, and graphite is preferable as a solid lubricant.

The present invention, which was completed based on the above findings, is a composition for forming a thermoplastic solid lubricating coating on a tubular threaded joint, characterized by comprising (1) a thermoplastic polymer as a coating matrix and (2) particles of a copolymer of a resin selected from a silicone resin and a fluorocarbon resin with a thermoplastic resin.

From another aspect, the present invention is a tubular threaded joint having improved performance in a low temperature environment which is constituted by a pin and a box, each having contact surface including threads and an unthreaded metal contact portion, characterized in that a thermoplastic solid lubricating coating which contains particles of a copolymer of a resin selected from a silicone resin and a fluorocarbon resin with a thermoplastic resin in a thermoplastic polymer as a coating matrix is formed as an uppermost surface treatment coating layer on the contact surface of one or both of the pin and the box. This tubular threaded joint is suitable for use in connecting oil country tubular goods. In one embodiment, the thermoplastic solid lubricating coating is formed on the contact surface of one of the pin and the box, and the contact surface of the other of the pin and the box has a solid corrosion-protecting coating based on an ultraviolet curing resin as an uppermost surface treatment coating layer.

In the copolymer of a resin selected from a silicone resin and a fluorocarbon resin with another thermoplastic resin which is used in the present invention, both the silicone resin and the fluorocarbon resin have a low friction (hereunder these resins being collectively referred to as low friction resins), and the copolymer itself maintains a low friction. Therefore, particles of such copolymer function as lubricating particles capable of conferring lubricity to a coating. Particles of this copolymer may hereinafter be referred to as low friction copolymer particles. Particles of a silicone resin or fluorocarbon resin alone have insufficient bonding strength to a thermoplastic polymer which constitutes the matrix of a lubricating coating. By copolymerizing the particles with a thermoplastic resin, the particles have an increased bonding strength in the thermoplastic polymer matrix.

During the formation of a lubricating coating, the low friction copolymer particles are protruded from the coating surface with the silicone or fluorocarbon resin portion of the copolymer particles facing outwards due to the action of surface tension and the affinity of the thermoplastic polymer matrix which is higher for the thermoplastic resin of the copolymer than for the silicone or fluorocarbon resin thereof. As a result, as shown in FIGS. 5(a) and 5(b), in the initial stage of makeup of a threaded joint when the surface pressure is still low (in the state of a low shouldering), the surface of the opposing member primarily contacts the low friction copolymer particles protruding from the surface of the lubricating coating, thereby decreasing the coefficient of friction of the coating. As the makeup proceeds to produce a high tightening pressure, the protruding low friction copolymer particles are embedded in the coating primarily due to their plastic deformation, and the surface of the opposing member also contacts the thermoplastic polymer matrix, thereby increasing the coefficient of friction of the entire coating compared to that at a low tightening pressure. When the makeup operation is repeated, the lubricating coating still retains the state shown in FIGS. 5(a) and 5(b) in the second and later cycle of makeup although the low friction copolymer particles wear to some extent, and satisfactory galling resistance is still maintained.

Roughly speaking, the coefficient of friction of a coating made solely of a thermoplastic polymer matrix is on the order of 0.1 to 0.2, while that of a coating containing low fiction copolymer particles in the matrix is on the order of 0.01 to 0.1. In particular, the coefficient of friction of the lubricating coating in the state shown in FIG. 5(a) is on the order of 0.05. In general, a coefficient of friction of 0.1 or greater is considered to be high friction, and a coefficient of friction of 0.05 or lower is considered to be low friction.

The low friction copolymer particles are preferably acrylic-silicone copolymer particles and more preferably acrylic-silicone copolymer particles having an average particle diameter of 10-40 micrometers. Their content in the coating is preferably 0.5-30 mass %.

The thermoplastic polymer matrix is preferably one or more polymers selected from a polyolefin resin and an ethylene-vinyl acetate copolymer resin.

The thermoplastic solid lubricating coating preferably further contains a solid lubricant, and the solid lubricant is preferably graphite.

From another standpoint, the present invention is a method of manufacturing a tubular threaded joint having a surface treatment coating layer, the tubular threaded joint being constituted by a pin and a box each having a contact surface including threads and an unthreaded metal contact portion, characterized by forming a solid lubricating coating as an uppermost surface treatment coating layer on the contact surface of at least one of the pin and box by application of a composition containing low friction copolymer particles in a molten thermoplastic polymer matrix followed by cooling to solidify the matrix material.

In one embodiment of this method, the solid lubricating coating is formed on the contact surface of one member of the pin and the box, and a solid corrosion-protecting coating is formed on the contact surface of the other member of the pin and the box as an uppermost surface treatment coating layer by application of a composition based on an ultraviolet curing resin followed by irradiation with ultraviolet light.

The present invention can form a thermoplastic solid lubricating coating having excellent galling resistance on the contact surface of a tubular threaded joint without using a compound grease. The solid lubricating coating has excellent performance in a low temperature environment, and even in an extremely low temperature environment of $-60°$ C. to $-20°$ C., the makeup torque and breakout torque of a threaded joint are not greatly increased and almost no deterioration is observed in the solid lubricating coating. Furthermore, this coating exhibits the same excellent galling resistance, gas tightness, and rust preventing properties as achieved with compound grease.

BRIEF EXPLANATION OF THE DRAWINGS

FIG. 4 is an explanatory view showing the contact surfaces of a tubular threaded joint according to the present invention, FIG. 4(a) shows an example of surface roughening of a contact surface itself, and FIG. 4(b) shows an example of forming a preparatory surface treatment coating for surface roughening of a contact surface.

MODES FOR CARRYING OUT THE INVENTION

Below, embodiments of a tubular threaded joint according to the present invention will be more specifically described by way of example.

Figure 2:
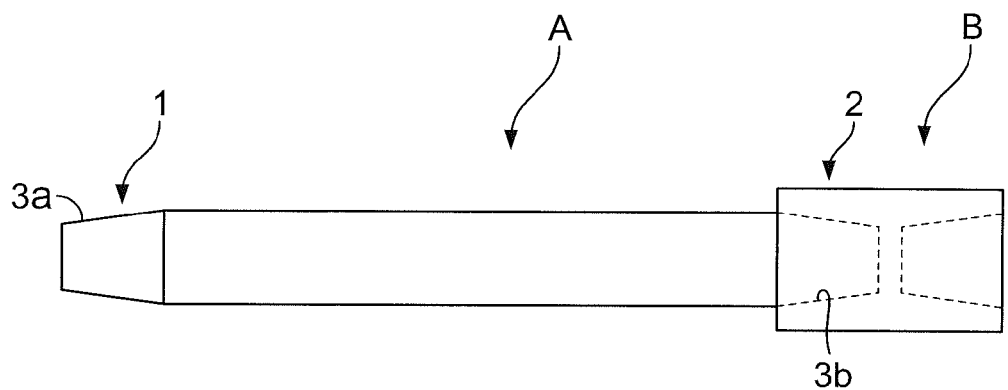
FIG. 2 schematically shows the assembled structure of a steel pipe and a coupling at the time of shipment of the steel pipe.

FIG. 2 schematically shows the state of a steel pipe for oil country tubular goods and a coupling at the time of shipment.

A pin 1 having male threads 3a is formed on the outer surface of both ends of a steel pipe A, and a box 2 having female threads 3b is formed on the inner surface of both sides of a coupling B. A pin means a member of a threaded joint having male threads, and a box means a member of a threaded joint having female threads. The coupling B is previously connected to one end of the steel pipe A. Prior to shipment, a protector (not shown) for protecting the threads is mounted on the pin of the steel pipe and the box of the coupling B which are not connected to other members, and these protectors are removed prior to use of a threaded joint.

In a typical tubular threaded joint, as shown in the figure, a pin is formed on the outer surface of both ends of a steel pipe, and a box is formed on the inner surface of a coupling which is a separate component. There are also integral tubular threaded joints which do not use a coupling and in which one end of a steel pipe is made a pin having male threads on its exterior and the other end is made a box having female threads on its interior. A tubular threaded joint according to the present invention can be applied to either of these types.

Figure 3:
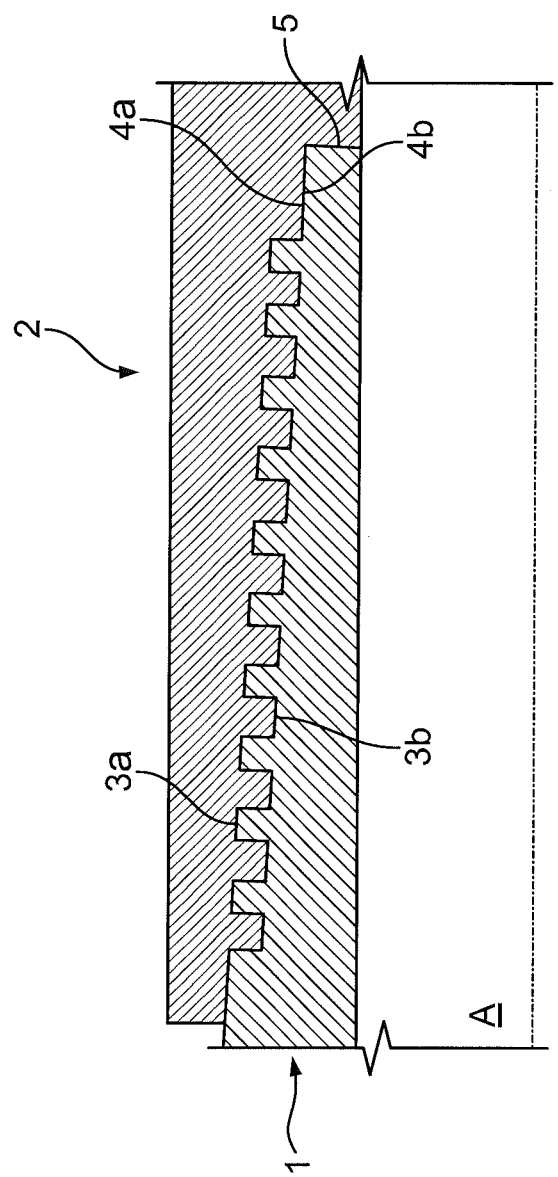
FIG. 3 schematically shows the connecting portion of a threaded joint.
Figure 5A:
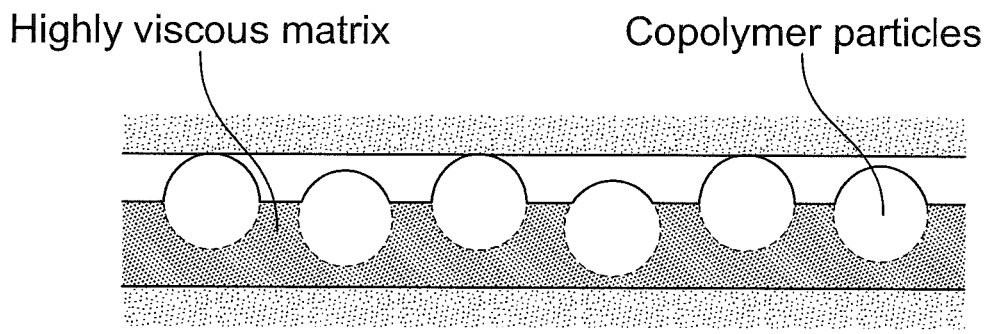
FIGS. 5a and 5b schematically show the mechanism of operation of a lubricating coating according to the present invention.
Figure 5B:
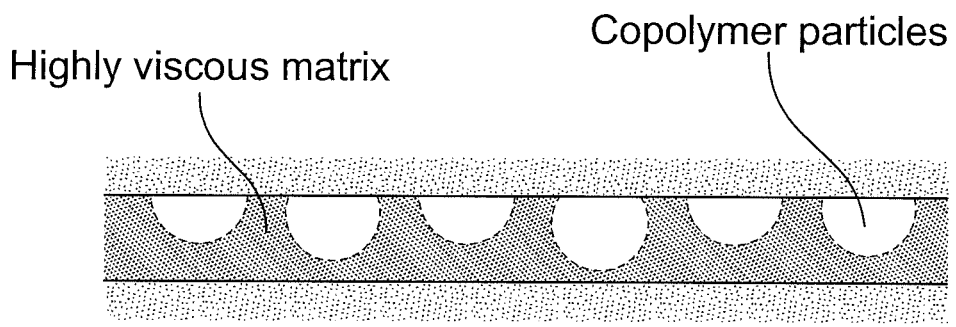

FIG. 3 schematically shows the structure of a typical tubular threaded joint. A tubular threaded joint is constituted by a pin 1 formed on the outer surface of the end of a steel pipe A, and a box 2 formed on the inner surface of a coupling B. The pin 1 has male threads 3a and a seal portion 4a and a shoulder portion 5 to positioned at the end of the steel pipe. Correspondingly, the box 2 has the female threads 3b and a seal portion 4b and a shoulder portion on the side of the threads remote from the end of the box.

In each of the pin 1 and the box 2, the seal portion and the shoulder portion constitute an unthreaded metal contact portion, and the threads and the unthreaded metal contact portion (namely, the seal portion and the shoulder portion) constitute a contact surface of the threaded joint. Galling resistance, gas tightness, and corrosion resistance are required for the contact surfaces of the pin and the box. In the past, for this purpose, compound grease containing heavy metal powder has been applied thereto. However, due to concerns of the adverse effects of heavy metals on humans and the environment, threaded joints having a solid lubricating coating which can be used for connection of oil country tubular goods without application of compound grease are being studied. A solid lubricating coating is typically a resin coating containing a solid lubricant.

However, if a conventional solid lubricating coating is used in an extremely cold environment of $-60°$ C. to $-20°$ C., there are the problems that the initial makeup torque becomes high, the unthreaded metal contact portions for guaranteeing gas tightness do not contact with a prescribed makeup pressure, and the threads are not completely engaged (a condition referred to as no shouldering), galling easily takes place during makeup, and even if makeup is achieved, the initial breakout torque at the time of breakout becomes extremely high. Furthermore, when tongs used for makeup of pipes have a low capacity, the problem that makeup cannot take place due to insufficient torque may occur.

According to the present invention, as shown in FIGS. 4(a) and 4(b) with respect to a seal portion, the contact surface of at least one of a pin and a box is coated with a particular thermoplastic solid lubricating coating 31a formed as an uppermost surface treatment coating atop a steel surface 30a or 30b. This solid lubricating coating can exhibit a lubrication-imparting function even when it is exposed to an extremely cold environment of $-60°$ C. to $-20°$ C., it can prevent galling of a threaded joint while preventing an increase in torque at the time of makeup or breakout, and it can guarantee gas tightness after makeup.

The substrate for the solid lubricating coating 31a (namely, the contact surface of the threaded joint) preferably has undergone surface roughening. As shown in FIG. 4(a), the surface roughening can be achieved by direct surface roughening by blasting treatment or pickling of the surface of the steel 30a, or it can be achieved by forming a preparatory surface treatment coating 32 having a rough surface (such as a phosphate coating or porous zinc (alloy) plating) on the surface of the steel 30b before forming the lubricating coating 31a.

The solid lubricating coating 31a can be formed by applying a thermoplastic solid lubricating coating-forming composition heated at an temperature sufficient to melt the thermoplastic polymer matrix by a suitable method such as spraying, brush application, or immersion and then solidifying the coating by a known cooling methods such as air cooling or natural cooling. Alternatively, a liquid composition containing a solvent can be applied in a conventional manner.

A solid lubricating coating may be formed on the contact surfaces of both a pin and a box, but for a pin and a box which are connected to each other prior to shipment as shown in FIG. 2, it is sufficient to form a lubricating coating on the contact surface of just one of the pin and the box. In this case, it is convenient to form a lubricating coating on the contact surface of a coupling (normally the contact surface of a box) because coating application is easier on the coupling (a short member) than on a long steel pipe.

For a pin and box which are not connected prior to shipment, a solid lubricating coating can be formed on the contact surfaces of both a pin and a box to simultaneously impart lubricating properties and rust preventing properties. Alternatively, a solid lubricating coating may be formed on the contact surface of just one of a pin and a box (such as the box), and a solid corrosion-protecting coating may be formed on the contact surface of the other member (such as the pin). In either case, galling resistance, gas tightness, and rust resistance can be imparted to a threaded joint. The solid corrosion-protecting coating is preferably an ultraviolet cured coating, and it is preferably formed after preparatory surface treatment for surface roughening.

The entirety of the contact surface of a pin and/or a box should be coated with a lubricating coating, but the present invention also includes the case in which only a portion of the contact surface (such as only the unthreaded metal contact portions) is coated.

[Thermoplastic Solid Lubricating Coating]

In the present invention, a thermoplastic solid lubricating coating is formed on the contact surface of at least one of a pin and a box constituting a tubular threaded joint. This solid lubricating coating is required to avoid the occurrence of no shouldering in which the makeup torque at the start of makeup becomes high and to prevent the initial breakout torque from becoming high in order to adequately prevent galling when steel pipes are connected by the threaded joint not only in cold, temperate, and tropical regions (at −20° C. to +50° C.), but also in extremely cold regions (at −60° C. to −20° C.) as well as to prevent rusting during storage.

A composition for forming a thermoplastic solid lubricating coating comprises a thermoplastic polymer matrix and low friction copolymer particles. Accordingly, the thermoplastic solid lubricating coating which is formed has a structure containing low friction copolymer particles dispersed in a thermoplastic polymer matrix. Because the coating contains low friction copolymer particles, the coating exhibits an effect of reducing friction, and it can markedly improve the galling resistance of a threaded joint. Moreover, the low friction copolymer particles can adequately exhibit the friction-reducing effect even at extremely low temperatures.

It is preferable to use a thermoplastic polymer having a melting temperature (or softening temperature; the same applies below) of 80° C.-320° C. to form a thermoplastic polymer matrix of a thermoplastic solid lubricating coating. The melting temperature is more preferably in the range of 90° C.-200° C. If the melting temperature of a thermoplastic polymer which forms a matrix of a coating, it becomes difficult to perform application in a molten state such as is the case with hot melt coating. On the other hand, if the melting temperature is too low, the solid lubricating coating softens when it is exposed to a high temperature in tropical regions or in summer even in temperate regions, leading to a deterioration in performance.

Examples of thermoplastic polymers which can be used as a matrix material in the present invention include, although not to limited thereto, polyolefins, polystyrenes, polyurethanes, polyamides, polyesters, polycarbonates, acrylic resins, and thermoplastic epoxy resins. The thermoplastic polymer may be a homopolymer or a copolymer.

As described later, a contact surface of a tubular threaded joint which is a substrate on which a lubricating coating is formed may be previously subjected to preparatory surface treatment such as chemical conversion treatment or plating. From the standpoints of the adhesion to the substrate, film-forming properties, coatability, viscosity at the time of melting, and dispersibility of low friction copolymer particles, it is preferable that the thermoplastic polymer which is used be a mixture of a plurality of types of thermoplastic polymers having different properties such as their melting point, softening point, and glass transition temperature.

Particularly preferred thermoplastic polymers for use as a matrix material are polyolefin resins and ethylene-vinyl acetate copolymer resins, and it is particularly preferred to use a mixture of at least two polyolefin resins having different melting points or softening points and an ethylene-vinyl acetate copolymer resin.

Low friction copolymer particles dispersed in a thermoplastic polymer matrix exhibit the effect of decreasing friction and lowering the torque even at extremely low temperatures. Therefore, a thermoplastic solid lubricating coating containing these particles can exhibit a greatly decreased friction while maintaining the adhesion of the coating even at extremely low temperatures of −60° C. to −20° C. This fact was first elucidated by the present inventors.

Low friction copolymer particles which are used in the present invention are in the form of a powder of a copolymer obtained by copolymerization of a low friction resin selected from a fluorocarbon resin such as polytetrafluoroethylene and a silicone resin with a monomer of another thermoplastic resin. This copolymer may be a block copolymer. Even when using particles of a copolymer of a low friction resin such as a silicone resin or a fluorocarbon resin with a thermoplastic resin, the low friction resin portion which has good sliding properties at low temperatures always faces the sliding surfaces, thereby making it possible to maintain substantially the same level of good lubricating properties as when using particles made solely of a low friction resin. In addition, the thermoplastic resin portion of the copolymer particles is compatible with the thermoplastic polymer forming a coating matrix, so the particles are strongly bonded to the matrix. Therefore, even when a high tightening pressure is applied, the particles do not easily drop off as is the case when particles made solely of a low friction resin are used. Even though the lubricating properties are initially good when using particles made solely of a low friction resin such as a silicone resin or a fluorocarbon resin, the wear resistance and durability of the coating decrease due to particles dropping off, and good lubricating properties cannot be maintained.

As the thermoplastic resin which forms a copolymer with a low friction resin, it is preferable to select a resin having affinity for the thermoplastic polymer used as a matrix of the thermoplastic resin coating. For example, it is possible to use a thermoplastic resin which is of the same type as the thermoplastic polymer used as the matrix of the coating. Some examples of a suitable thermoplastic resin are acrylic resins, urethane resins, polyester resins, polycarbonate resins, polyimide resins, and thermoplastic epoxy resins.

A copolymer of a low friction resin and a thermoplastic resin monomer can be prepared by copolymerizing the thermoplastic resin monomer with a reactive silicone or fluorocarbon resin having a functional group capable of reacting the thermoplastic resin monomer which has previously been introduced into the resin. The reactive functional group which can be introduced into a silicone or fluorocarbon resin is a (meth)acrylic group in the case of copolymerization with an acrylic resin, a hydroxyl group in copolymerization with a urethane resin, an epoxy group, a carboxyl group, or a hydroxyl group in copolymerization with a polyester resin, a phenolic group in copolymerization with a polycarbonate resin, an amino group in copolymerization with a polyimide resin, and a hydroxyl group in copolymerization with a thermoplastic epoxy resin.

An example of a low friction copolymer particle which can be advantageously used in the present invention is an acrylic-silicone copolymer particle. This is a particulate (powdery) copolymer obtainable by copolymerization of a silicone resin with an acrylic monomer, and which can be prepared by copolymerizing a polyorganosiloxane having a free radically polymerizable terminal group (such as a (meth)acrylic group) with a (meth)acrylate ester. The proportion of the polyorganosiloxane and the (meth)acrylate ester in this copolymer is preferably 60-80:20-40 as a mass ratio. The size of the copolymer particles is preferably such that the average particle diameter is in the range of 10-400 micrometers.

Copolymerization can be carried out by emulsion polymerization or the like using a suitable liquid medium and a free radical polymerization initiator. The resulting copolymer in the form of an emulsion is subjected to solid-liquid separation so as to recover the solids, and the desired copolymer particles are obtained in the form of secondary particles which are aggregates of the minute particles in the emulsion (primary particles). In the present invention, the particles and particle diameter mean the secondary particles and the particle diameter of the secondary particles, respectively. The shape of the copolymer particles may be either amorphous or spherical, but preferably it is spherical, i.e., they are preferably spherical particles.

Spherical acrylic-silicone copolymer particles having an average particle diameter of 10-40 micrometers are particularly suitable for the present invention. Spherical acrylic-silicone copolymer particles having an average particle diameter of 30 micrometers are sold by Nissin Chemical Industry Co., Ltd. under the product name Chaline R-170S. This product can be used as low friction copolymer particles in the present invention.

The thermoplastic solid lubricating coating contains low friction copolymer particles, preferably acrylic-silicone copolymer particles, dispersed in a thermoplastic polymer matrix. In the case of a tubular threaded joint for connecting oil country tubular goods, the content of the acrylic-silicone copolymer particles in the thermoplastic solid lubricating coating is preferably in the range of 0.5-30 mass % and more preferably in the range of 1-20 mass %. If this content is less than 0.5 mass %, the friction reducing effect and the adhesion of the coating at extremely low temperatures become insufficient, while if the content exceeds 30 mass %, the ability to form a coating decreases, and it may become difficult to form a quality coating.

In order to further improve lubricating properties, the thermoplastic solid lubricating coating may additionally contain various solid lubricants. A solid lubricant means a powder having lubricating properties. Solid lubricants can be roughly classified as follows:

(1) ones which exhibit lubricating properties due to having a crystal structure which easily slides such as a hexagonal layer crystal structure (e.g., graphite, zinc oxide, and boron nitride);

(2) ones exhibiting lubricating properties due to having a reactive element in addition to a crystal structure (e.g., molybdenum disulfide, tungsten disulfide, graphite fluoride, tin sulfide, and bismuth sulfide);

(3) ones exhibiting lubricating properties due to having chemical reactivity (e.g., certain thiosulfate compounds), and (4) ones exhibiting lubricating properties due to plastic or viscoplastic behavior under a frictional stress (e.g., polytetrafluoroethylene (PTFE) and polyamides).

Any of these types of solid lubricants can be used, but type (1) is preferred. Solid lubricants of type (1) can be used by themselves, or they can be used in combination with solid lubricants of type (2) and/or type (4).

Graphite is a particularly preferred solid lubricant from the standpoints of not interfering with the effects of acrylic-silicone copolymer particles as well as adhesion and rust prevention, and amorphous (earthy) graphite is still more preferred from the standpoint of the ability to form a coating. The content of the solid lubricant in the thermoplastic solid lubricating coating is preferably in the range of 2-15 mass %.

In addition to a solid lubricant, the thermoplastic solid lubricating coating may contain an inorganic powder for adjusting sliding properties. Examples of such an inorganic powder are titanium dioxide and bismuth oxide. In order to strengthen the rust preventing properties of a coating, the thermoplastic solid lubricating coating may contain an anticorrosive agent. An example of a preferred anticorrosive agent is calcium ion exchanged silica. Commercially available reactive water repellents may also be used. These inorganic powders, anticorrosive agents, and other additives may be present in the thermoplastic lubricating coating in a total amount of up to 20 mass %.

In addition to the above-described components, the thermoplastic solid lubricating coating may contain small amounts of other additives selected from surface active agents, colorants, antioxidants, and the like in an amount of at most 5 mass %, for example. It may also contain an extreme pressure agent, a liquid lubricant, or the like in an extremely small amount of at most 2 mass %.

According to the present invention, a solid lubricating coating-forming composition for forming the above-described thermoplastic solid lubricating coating (referred to below as a coating composition) is provided. This coating composition may be a solventless (or non-solvent) composition consisting essentially of the above-described components, or it may be a solvent-based composition in which a thermoplastic polymer matrix is dissolved in a solvent.

A solventless coating composition can be prepared by, for example, adding acrylic-silicone copolymer particles, a solid lubricant and other additives to a molten thermoplastic polymer matrix followed by blending or kneading. Alternatively, a powder mixture in which all the components in a powder state are mixed can be used as a coating composition. A solventless coating material has the advantages that it can form a lubricating coating in a short period of time and that there is no evaporation of organic solvents which are harmful to the environment.

Such a solventless coating composition can form a thermoplastic solid lubricating coating by the hot melt method, for example. In this method, a coating composition (containing the above-described thermoplastic polymer matrix and various powders) which has been heated to cause the thermoplastic polymer matrix to melt and form a fluid composition having a viscosity low enough for coating is sprayed by a spray gun having the ability to maintain a fixed temperature (normally around the same temperature as the composition in a molten state). The temperature to which the composition is heated is preferably made 10° C.-50° C. higher than the melting point (the melting temperature or the softening temperature) of the thermoplastic polymer matrix. It is acceptable for the low friction copolymer particles in the coating composition (such as acrylic-silicone copolymer particles) to partially melt during heating.

The substrate being coated (namely, the contact surface of a pin and/or a box) is preferably preheated to a temperature higher than the melting point of the thermoplastic polymer matrix. By performing preheating, a good coating ability can be obtained. When the coating composition contains a small amount (such as at most 2%) of a surface active agent such as polydimethylsiloxane, a good coating can be formed even if the substrate is not preheated or if the preheating temperature is lower than the melting point of the polymer matrix.

The coating composition is heated and melted inside a tank equipped with a suitable stirring apparatus, and it is supplied to the spraying head (which is maintained at a prescribed temperature) of a spray gun through a metering pump by a compressor and sprayed at the substrate. The temperature at which the inside of the tank and the spraying head are maintained is adjusted in accordance with the melting point of the polymer matrix in the composition.

The substrate is then cooled by air cooling or natural cooling to solidify the thermoplastic polymer matrix and form a thermoplastic solid lubricating coating according to the present invention atop the substrate. The thickness of a thermoplastic solid lubricating coating formed in this manner is preferably in the range of 10-200 μm and more preferably in the range of 25-100 μm. If the thickness of the thermoplastic solid lubricating coating is too small, the lubricating properties of a tubular threaded joint are insufficient and it becomes easy for galling to occur at the time of makeup or breakout. This thermoplastic solid lubricating coating has also corrosion resistance to some extent, but if the coating thickness is too small, the corrosion resistance becomes inadequate and the corrosion resistance of contact surface of a tubular threaded joint decreases.

On the other hand, making the thickness of the thermoplastic solid lubricating coating too large not only wastes lubricant but also is contrary to preventing environmental pollution, which is one object of the present invention.

When the thermoplastic solid lubricating coating and the below-described solid corrosion-protecting coating which is formed as necessary are formed atop a contact surface having its surface roughness increased by preparatory surface treatment, they both preferably have a coating thickness larger than the roughness Rmax of the substrate having an increased surface roughness. If the thickness is not larger than this roughness, it is sometimes not possible to completely cover the surface of the substrate. The coating thickness when the substrate has a rough surface is the average value of the coating thickness of the entire coating, which can be calculated from the surface area, the mass, and the density of the coating.

[Solid Corrosion-Protecting Coating]

When the above-described thermoplastic solid lubricating coating is formed on the contact surface of only one of the pin and the box (such as the box) of a tubular threaded joint, the contact surface of the other member (such as the pin) may undergo just the below-described preparatory surface treatment. However, in order to impart rust preventing properties, a solid corrosion-protecting coating is preferably formed as an uppermost surface treatment coating layer on the contact surface of the other member.

Figure 1:
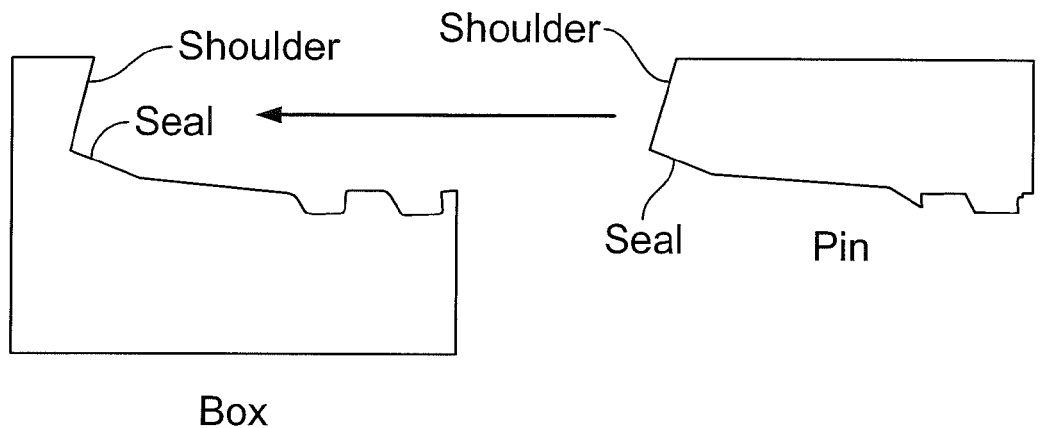
FIG. 1 schematically shows the unthreaded metal contact portions (shoulder portions and the seal portions) of a pin and a box of a special threaded joint.

As described above with respect to FIG. 1, up to the time when a tubular threaded joint is actually used, a protector is often mounted on the pin and box which have not been connected to another member. The solid corrosion-protecting coating must not be destroyed under at least the force applied when mounting a protector thereon, it must not dissolve when exposed to water which is formed by condensation due to the dew point during transport or storage, and it must not easily soften at a high temperature exceeding 40° C.

In a preferred embodiment of the present invention, a solid corrosion-protecting coating which can satisfy these properties is formed from a composition based on an ultraviolet curing resin, which is known to be able to form a high strength coating. Known resin compositions comprising at least a monomer, an oligomer, and a photopolymerization initiator can be used as an ultraviolet curing resin. There are no particular limitations on the components or composition of an ultraviolet curing resin as long as a photopolymerization reaction is produced by irradiation with ultraviolet light to form a cured coating.

Some non-limiting examples of monomers are polyvalent (di, tri, or higher) esters of polyhydric alcohols with (meth)acrylic acid, various (meth)acrylates, N-vinylpyrrolidone, N-vinylcaprolactam, and styrenes. Some non-limiting examples of oligomers are epoxy (meth)acrylates, urethane (meth)acrylates, polyester (meth)acrylates, polyether (meth)acrylates, and silicone (meth)acrylates.

Useful photopolymerization initiators are compounds having absorption in a wavelength region of 260-450 nm, examples of which are benzoin and its derivatives, benzophenone and its derivatives, acetophenone and its derivatives, Michler's ketone, benzil and its derivatives, tetralkylthiuram monosulfides, and thioxanes. It is particularly preferable to use thioxanes.

From the standpoints of coating strength and sliding properties, a solid corrosion-protecting coating formed from an ultraviolet curing resin may contain additives selected from lubricants, fibrous fillers, and anticorrosive agents in the coating.

Examples of a lubricant are metal soaps such as calcium stearate and zinc stearate, and polytetrafluoroethylene (PTFE) resin. An example of a fibrous filler is acicular calcium carbonate such as Whiskal sold by Maruo Calcium Co., Ltd. One or more of these additives can be added in an amount of 0.05-0.35 parts by mass with respect to one part by mass of the ultraviolet curing resin. If the amount is less than 0.05 parts, the strength of the coating is sometimes inadequate. On the other hand, if the amount exceeds 0.35 parts, the viscosity of a coating composition becomes high and the ease of coating decreases, and this sometimes leads to a decrease in coating strength.

Examples of an anticorrosive agent are aluminum tripolyphosphate and aluminum phosphite. The anticorrosive agent can be added in an amount of up to 0.10 parts by mass with respect to one part by mass of the ultraviolet curing resin.

A solid corrosion-protecting coating Rutted from an ultraviolet curing resin is often transparent. From the standpoint of facilitating quality inspection (such as inspection for the presence or absence of a coating or for uniformity or unevenness of the coating thickness) by visual examination or by image processing of the solid corrosion-protecting coating which is formed, the solid corrosion-protecting coating may contain a colorant. Colorants which are used can be selected from pigments, dyes, and fluorescent materials. Fluorescent materials sometimes do not give coloration to a coating under visible light, but they give coloration to the coating at least under ultraviolet light. Therefore, they are included as colorants in the present invention. These colorants may be commercially available ones, and there are no particular restrictions thereon as long as quality inspection of a solid corrosion-protecting coating is possible visually or by image processing. Either organic or inorganic colorants may be used.

The transparency of a solid corrosion-protecting coating decreases or disappears when a pigment is added. If a solid corrosion-protecting coating becomes non-transparent, it becomes difficult to inspect for damage of the threads of the pin which forms a substrate. Accordingly, when a pigment is used, one having a high degree of brightness such as a yellow or white pigment is preferred. From the standpoint of corrosion prevention, the particle diameter of a pigment is preferably as small as possible, and it is preferable to use a pigment with an average particle diameter of at most 5 μm. Dyes do not greatly decrease the transparency of a solid corrosion-protecting coating, so there are no problems with using a dye having a strong color such as red or blue. The added amount of the pigment or a dye is preferably a maximum of 0.05 parts by mass with respect to one part by mass of the ultraviolet curing resin. If the amount exceeds 0.05 parts by mass, corrosion resistance may decrease. A more preferred added amount is at most 0.02 parts by mass.

A fluorescent material can be any of a fluorescent pigment, a fluorescent dye, and a phosphor used in a fluorescent paint Fluorescent pigments are roughly categorized as inorganic fluorescent pigments and daylight fluorescent pigments.

Examples of inorganic fluorescent pigments are ones based on zinc sulfide or zinc cadmium sulfide (containing a metal activator), halogenated calcium phosphates, rare earth activated strontium chloroapatites, and the like. Two or more of these can often be used in combination. Inorganic fluorescent pigments have excellent resistance to weather and heat.

There are several types of daylight fluorescent pigments, but the main types are synthetic resin solid solution types in which a fluorescent dye is incorporated into a colorless synthetic resin to form a pigment. Fluorescent dyes can also be used by themselves. Various types of inorganic or organic fluorescent pigments and particularly synthetic resin solid solution types are used in fluorescent paints and fluorescent printing inks, and these phosphors (fluorescent materials) can be used as fluorescent pigments or fluorescent dyes.

A solid corrosion-protecting coating containing a fluorescent pigment or dye is colorless or has a transparent color under visible light. However, when it is irradiated with black light or ultraviolet light, it fluoresces and becomes colored, and it becomes possible to ascertain whether or not a coating is present or to ascertain unevenness in the coating thickness. As the coating is transparent under visible light, the substrate underneath the solid corrosion-protecting coating, namely, the surface of the substrate can be visually observed. Accordingly, visual inspection for damage of the threads of a threaded joint is not obstructed by the solid corrosion-protecting coating.

The added amount of these fluorescent materials is preferably up to approximately 0.05 parts by mass with respect to one part by mass of the ultraviolet curing resin. If the added amount exceeds 0.05 parts by mass, corrosion resistance may decrease. A more preferred added amount is at most 0.02 parts by mass.

In order to make it possible to carry out quality control not only of the solid corrosion-protecting coating but also of the underlying threads, it is preferable to use a fluorescent material and particularly a fluorescent pigment as a colorant.

After a composition based on an ultraviolet curing resin (including a composition consisting essentially of components of an ultraviolet curing resin) is applied to the contact surface of a threaded joint, the coating is cured by irradiation with ultraviolet light to form a solid corrosion-protecting coating made from an ultraviolet cured resin layer.

By repeating coating and irradiation with ultraviolet light, it is possible to form a solid corrosion-protecting coating having two or more layers of an ultraviolet curing resin. By using multiple layers of a corrosion-protecting coating, the coating strength is further increased, the solid corrosion-protecting coating is not destroyed even when a large force is applied at the time of makeup of a threaded joint, and the corrosion resistance of the threaded joint is further increased. In the present invention, because a lubricating coating is not present beneath the solid corrosion-protecting coating, it is not necessary for the solid corrosion-protecting coating to be destroyed during makeup of a threaded joint. Not destroying the solid corrosion-protecting coating increases the corrosion resistance of a threaded joint.

Irradiation with ultraviolet light can be carried out using a commercially available ultraviolet light irradiation apparatus having an output wavelength in the region of 200-450 nm. Examples of a source of ultraviolet light are high pressure mercury vapor lamps, ultrahigh pressure mercury vapor lamps, xenon lamps, carbon arc lamps, metal halide lamps, and sunlight. The length of time for which irradiation is performed and the strength of the irradiated ultraviolet light can be suitably set by one skilled in the art.

The thickness of the solid corrosion-protecting coating (the total coating thickness when there are two or more layers of an ultraviolet curing resin) is preferably in the range of 5-50 μM and more preferably in the range of 10-40 μm. It is preferably smaller than the thickness of the solid lubricating coating formed on the opposing member. If the thickness of the solid corrosion-protecting coating is too small, it does not adequately function as a corrosion-protecting coating, and the corrosion resistance of a tubular threaded joint may be inadequate. On the other hand, if the thickness of the solid corrosion-protecting coating exceeds 50 μm, when a protective member such as a protector having high gas tightness is mounted on the end of an oil country tubular good, the solid corrosion-protecting coating may be destroyed by the force at the time of mounting the protector, and the corrosion resistance of a tubular threaded joint becomes inadequate. Furthermore, at this time, powder produced by wear is discharged into the environment and the work environment is worsened. In addition, a solid corrosion-protecting coating having a thickness larger than the thickness of the solid lubricating coating on the opposing member may interfere with the lubricating performance of the lubricating coating.

Since a solid corrosion-protecting coating based on an ultraviolet curing resin is transparent, the condition of a substrate can be observed without removing the coating, and threads can be inspected from above the coating prior to makeup. Accordingly, by forming this solid corrosion-protecting coating on the contact surface of a pin in which threads are formed on its outer surface and hence are more susceptible to damage than the threads of a box, it is possible to easily inspect for damage to the threads of a pin while leaving the coating in place.

[Preparatory Surface Treatment]

The threads and seal portions of a pin and a box which constitute the contact surfaces of a tubular threaded joint are formed by cutting operations including thread cutting. Their surface roughness is typically around 3-5 µm. If the surface roughness of the contact surfaces is greater than this amount, the adhesion of a coating formed atop them can be increased, and as a result, performance such as galling resistance and corrosion resistance can be improved. Therefore, prior to forming a coating, preparatory surface treatment which can increase the surface roughness is preferably carried out on the contact surface of at least one and preferably both of the pin and the box.

Examples of such preparatory treatment are blasting by projecting blasting material such as spherical shot or angular grit, and pickling by immersion in a strongly acidic solution such as sulfuric acid, hydrochloric acid, nitric acid, or hydrofluoric acid to roughen the skin. These treatments can increase the surface roughness of the substrate itself.

Examples of another type of preparatory surface treatment are chemical conversion treatment such as phosphate treatment, oxalate treatment, or borate treatment, and metal plating. These methods form an undercoating layer having a large surface roughness and a high adhesion on the surface of the substrate. A chemical conversion coating formed by a chemical conversion treatment is made of acicular crystals with a large surface roughness. Examples of metal plating are electroplating with copper, iron, or alloys thereof (protrusions are preferentially plated, so the surface becomes slightly rougher); impact plating with zinc or a zinc alloy in which particles having an iron core coated with zinc or a zinc-iron alloy are projected using centrifugal force or air pressure, thereby forming a porous metal coating by deposition of zinc or zinc-iron alloy particles; and composite metal plating in which a coating having minute solid particles dispersed in metal is formed.

Whichever method is used for preliminary surface treatment of the contact surface, the surface roughness Rmax resulting from surface roughening by preparatory surface treatment is preferably 5-40 µm. If Rmax is less than 5 µm, the adhesion of the lubricating or corrosion-protecting coating which is formed atop the roughened surface may be inadequate. On the other hand, if Rmax exceeds 40 µm, friction increases, and the coating may not able resist shear forces and compressive forces and may be easily destroyed or peel off when it is subjected to a high tightening pressure. Two or more types of preparatory surface treatment for surface roughening may be used in combination. In addition, different types of preparatory surface treatment can be carried out on the pin and the box.

From the standpoint of adhesion of the solid corrosion-protecting coating or the solid lubricating coating, preparatory surface treatment which can form a porous coating is preferred. In particular, phosphate treatment using manganese phosphate, zinc phosphate, iron manganese phosphate, or zinc calcium phosphate, or impact plating to form a zinc or zinc-iron alloy coating is preferred as preparatory surface treatment. From the standpoint of the adhesion of a coating formed atop it, a manganese phosphate coating is preferred, and from the standpoint of corrosion resistance, a zinc or zinc-iron alloy coating with which a sacrificial corrosion effect due to zinc can be expected is preferred.

Manganese phosphate chemical conversion treatment is particularly preferred as preparatory surface treatment for a solid lubricating coating, and zinc phosphate chemical conversion treatment and zinc or zinc-iron alloy plating by impact plating are particularly preferred as preparatory surface treatment for a solid corrosion-protecting coating.

A coating formed by phosphate treatment and a zinc or zinc-iron alloy coating formed by impact plating are both porous coatings. By forming a solid corrosion-protecting coating or a solid lubricating coating atop such a porous coating, the adhesion of the upper coating is increased by the so-called anchor effect of the lower porous coating. As a result, it becomes difficult for peeling of the solid lubricating coating or the solid corrosion-protecting coating to take place even if makeup and breakout are repeated, and galling resistance, gas tightness, and corrosion resistance are further increased.

Phosphate treatment can be carried out by immersion or spraying in a conventional manner. An acidic phosphating solution which is commonly used for zinc-plated steel materials can be used in this treatment. For example, a zinc phosphating solution containing 1-150 g/L of phosphate ions, 3-70 g/L of zinc ions, 1-100 g/L of nitrate ions, and 0-30 g/L of nickel ions can be used. It is also possible to use a manganese phosphating solution normally used for threaded joints. The temperature of the solution can be from room temperature to 100° C., and the duration of treatment can be up to 15 minutes in accordance with the desired coating thickness. In order to accelerate coating formation, an aqueous surface conditioning solution containing colloidal titanium may be supplied to the surface to be treated prior to phosphate treatment. After phosphate treatment, washing is preferably carried out with cold or warm water followed by drying.

Impact plating can be carried out by mechanical plating in which particles are impacted with a material to be plated inside a rotating barrel, or by blast plating in which particles are impacted against the material to be plated using a blasting apparatus. In the present invention, it is sufficient to plate just the contact surface of a threaded joint, so it is preferable to employ blast plating which can perform localized plating.

For example, a blasting material in the form of particles having an iron core coated with zinc or a zinc alloy (such as zinc-iron alloy) is projected against a contact surface to be coated. The content of zinc or a zinc alloy in the particles is preferably in the range of 20-60 mass %, and the particle diameter is preferably in the range of 0.2-1.5 mm Blasting of the particles causes only the zinc or zinc alloy which is the coating layer of the particles to adhere to the contact surface, and a porous coating made of zinc or a zinc alloy particles is formed atop the contact surface. This impact plating can form a plated coating having good adhesion to a steel surface regardless of the composition of the steel.

From the standpoints of corrosion resistance and adhesion, the thickness of a zinc or a zinc alloy layer formed by impact plating is preferably 5-40 µm. If it is less than 5 µm, sufficient corrosion resistance cannot be guaranteed. On the other hand, if it exceeds 40 µm, adhesion of a coating formed thereon sometimes decreases. Similarly, the thickness of a phosphate coating is preferably in the range of 5-40 µm.

Another possible preparatory surface treatment is a particular type of single or multiple layer electroplating, which is effective for increasing galling resistance when used to form a substrate for a solid lubricating coating although it does not provide a surface roughening effect. Examples of such plating are single-layer plating with Cu, Sn, or Ni, single-layer plating with a Cu—Sn alloy as disclosed in JP 2003-74763 A, two-layer plating with a Cu layer and an Sn layer, and three-layer plating with an Ni layer, a Cu layer, and an Sn layer. Cu—Sn alloy plating, two-layer plating by Cu plating and Sn plating, and three-layer plating by Ni plating, Cu plating, and Sn plating are preferred for a steel pipe made from a steel having a Cr content of at least 5%. More preferred are two-layer plating by Cu plating and Sn plating, three-layer plating by Ni strike plating, Cu plating, and Sn plating, and Cu—Sn—Zn alloy plating. Such metal or alloy plating can be carried out by the methods described in JP 2003-74763 A. In the case of multiple layer plating, the lowermost plating layer (usually Ni plating) is preferably an extremely thin plating layer having a thickness of less than 1 μm formed by the so-called strike plating. The thickness of plating (the overall thickness in the case of multiple layer plating) is preferably in the range of 5-15 μm.

EXAMPLES

Below, examples of the present invention will be described. However, the present invention is not limited by the examples. In the examples, the contact surface of a pin will be referred to as the pin surface and the contact surface of a box will be referred to as the box surface. Unless otherwise specified, percent and part in the examples mean mass percent and part by mass, respectively.

Example 1

The pin surface and the box surface of a tubular threaded joint (outer diameter of 17.78 cm (7 inches), wall thickness of 1.036 cm (0.408 inches)) made of carbon steel (C, 0.21%, Si: 0.25%, Mn: 1.1%, P: 0.02%, S: 0.01%, Cu: 0.04%, Ni: 0.06%, Cr: 0.17%, Mo: 0.04%, remainder: iron and impurities) were subjected to the following preparatory surface treatment.

The pin surface which was finished by machine grinding (surface roughness of 3 μm) was immersed for 10 minutes in a zinc phosphating solution at 75-85° C. to form a zinc phosphate coating with a thickness of 8 μm (surface roughness of 8 μm).

The box surface which was finished by machine grinding (surface roughness of 3 μm) was immersed for 10 minutes in a manganese phosphating solution at 80-95° C. to form a manganese phosphate coating with a thickness of 12 μm (surface roughness of 10 μm).

A composition for forming a solid lubricating coating having the below-described composition was heated to 160° C. in a tank equipped with a stirring mechanism to form it into a molten state having a viscosity suitable for coating, and the pin surface and the box surface which had undergone the above-described preparatory surface treatment were preheated to 130° C. by induction heating. The solid lubricating coating-forming composition in which the matrix polymer is in molten state was sprayed at both the pin surface and the box surface using a spray gun having a spraying head with a temperature maintaining function. After cooling, a solid lubricating coating having a thickness of 50 μm was formed.

Composition of the Lubricating Coating-Forming Composition:

(Thermoplastic Polymer Matrix)
21.5% of a polyolefin resin (HM321 of Cemedine Co. Ltd., softening point of 130° C.),
21.5% of an ethylene-vinyl acetate copolymer resin (HM221 of Cemedine Co., Ltd., softening point of 105° C.), and
42% of a low molecular weight polyolefin (210P of Mitsui Chemicals, Inc., softening point of 123° C.).
(Acrylic-Silicone Copolymer Particles)
10% of Chaline R-170S (Nissin Chemical Industry Co., Ltd., average particle diameter of 30 μm).
(Solid Lubricant)
5% of amorphous graphite (Blue P of Nippon Graphite Industries, Ltd., average particle diameter of 7 μm).

A repeated makeup and breakout test was performed up to 10 times on a tubular threaded joint treated as above (makeup speed of 10 rpm, makeup torque of 20 kN-m) at room temperature (approximately 20° C.) and at approximately −40° C. by cooling the periphery of the threaded joint with dry ice. The shouldering torque ratio and the breakout torque ratio on the first cycle (both were relative values with the shouldering torque and the breakout torque at the time of makeup with a compound grease being given a value of 100), the adhesion of the solid lubricating coating (which was determined by whether there was peeling or cracking of the coating when exposed to each temperature, and by the condition of the coating after the first cycle of makeup and breakout), and the state of galling of the contact surfaces of the pin and the box after repeated makeup (the number of times that makeup could be performed without the occurrence of galling, up to a maximum of 10 times; when light galling which could be repaired occurred, repair was performed and makeup was continued) were investigated. The results are shown in Table 1.

As shown in Table 1, in Comparative Example 1 in which a solid lubricating coating did not include the above-described acrylic-silicone copolymer particles, the torque ratio at −40° C. was extremely high, whereas in Example 1 in which a solid lubricating coating contained the above-described copolymer particles, the torque level was around the same as when using a compound grease both at room temperature and at −40° C. The adhesion of the coating was also good. There was no occurrence of galling, and makeup and breakout could be performed 10 times Example 2

The pin surface and the box surface of the same tubular threaded joint made of carbon steel as used in Example 1 were subjected to the following surface treatment.

The pin surface which was finished by machine grinding (surface roughness of 3 μm) was immersed for 10 minutes in a zinc phosphating solution at 75-85° C. to form a zinc phosphate coating with a thickness of 8 μm (surface roughness of 8 μm). An ultraviolet curing resin coating compositions prepared by adding 0.05 parts of aluminum phosphite as an anticorrosive agent and 0.01 parts of polyethylene wax as a lubricant to one part of the resin content of an acrylic resin-based ultraviolet curing resin paint made by Chugoku Marine Paints Ltd. was applied atop the zinc phosphate coating of the pin surface and was irradiated with ultraviolet light under the following conditions to cure the coating and form an ultraviolet cured resin coating having a thickness of 25 μm on the pin surface. The resulting solid corrosion-protecting coating was colorless and transparent, and the male threads of the pin could be inspected with the naked eye or with a magnifying glass from atop the coating.

UV lamp: Water-cooled mercury vapor lamp,
UV lamp output: 4 kW,
Wavelength of UV light: 260 nm.

The box surface which was finished by machine grinding (surface roughness of 3 μm) was subjected to electroplating first by Ni strike plating and then by Cu—Sn—Zn alloy plating to form a plated coating having a total thickness of 8 μm. A lubricating coating-forming composition having the following composition was heated to 160° C. in a tank having a stirring mechanism to obtain a molten state with a viscosity suitable for coating. After the box surface which underwent the above-described preparatory surface treatment was preheated to 130° C. by induction heating, the molten composition for forming a solid lubricating coating was applied to the preheated box surface using a spray gun having a spraying head with a temperature maintaining mechanism After cooling, a solid lubricating coating having a thickness of 50 μm was formed on the box surface.

Composition of the Lubricating Coating-Forming Composition:

(Thermoplastic Polymer Matrix)
22.5% of a polyolefin resin (HM321 of Cemedine Co., Ltd., softening point of 130° C.),
22.5% of an ethylene-vinyl acetate copolymer resin (HM221 of Cemedine Co., Ltd., softening point of 105° C.),
45% of a low molecular weight polyolefin (210P of Mitsui Chemicals, Inc., melting point of 123° C.);
(Acrylic-Silicone Copolymer Particles)
5% of Chaline R-170S (Nissin Chemical Industry Co., Ltd., average particle diameter of 30 μm);
(Solid Lubricant)
5% of amorphous graphite (Blue P of Nippon Graphite Industries, Ltd., average particle diameter of 7 μm).

A repeated makeup and breakout test of a tubular threaded joint was carried out at room temperature and at approximately −40° C. in the same manner as in Example 1. As shown in Table 1, in Comparative Example 1 in which a solid lubricating coating did not contain acrylic-silicone copolymer particles, the torque ratio at −40° C. was extremely high, whereas in Example 2 in which a solid lubricating coating contained acrylic-silicone copolymer particles, the torque level was approximately the same as when using compound grease both at room temperature and at a low temperature of −40° C. The adhesion of the coating was good. Furthermore, there was no occurrence of galling, and makeup and breakout could be performed 10 times.

Example 3

The pin surface and the box surface of a tubular threaded joint (outer diameter: 24.448 cm (9⅝ inches), wall thickness: 1.105 cm (0.435 inches)) made of a 13Cr steel (C, 0.19%, Si: 0.25%, Mn: 0.9%, P: 0.02%, S: 0.01%, Cu: 0.04%, Ni: 0.11%, Cr: 13%, Mo: 0.04%, remainder: iron and impurities) which is more susceptible to galling than carbon steel were subjected to the following surface treatment.

To the pin surface which was finished by machine grinding (surface roughness of 3 μm), an ultraviolet curing resin coating composition prepared by adding 0.05 parts of aluminum tripolyphosphate as an anticorrosive agent, 0.01 part of polyethylene wax as a lubricant, and 0.003 parts of a fluorescent pigment to one part of the resin content of an acrylic resin-based ultraviolet curing resin paint made by Chugoku Marine Paints Ltd. was applied and irradiated with ultraviolet light under the following conditions for curing to form an ultraviolet cured resin coating having a thickness of approximately 25 μm. The resulting solid corrosion-protecting coating was colorless and clear, and the male threads of the pin could be inspected with the naked eye or with a magnifying glass from above the coating.

UV lamp: Water-cooled mercury vapor lamp,
UV lamp output: 4 kW,
Wavelength of UV light: 260 nm The box surface which was finished by machine grinding (surface roughness of 3 μm) was subjected to electroplating first by Ni strike plating and then by Cu—Sn—Zn alloy plating to form a plated coating with a total thickness of 8 μm. A lubricating coating-forming composition having the below-described composition was then heated to 160° C. in a tank equipped with a stirring mechanism to form a composition having a molten matrix material with a viscosity suitable for coating. The box surface which underwent preparatory surface treatment in the above-described manner was preheated to 150° C. by induction heating, and then the molten composition for forming a solid lubricating coating was applied to the preheated box surface using a spray gun having a spraying head with a temperature maintaining mechanism. After cooling, a solid lubricating coating with a thickness of 100 μm was formed.

Composition of the Lubricating Coating-Forming Composition (Thermoplastic Polymer Matrix)
20% of a polyolefin resin (HM321 of Cemedine Co., Ltd., softening point of 130° C.),
20% of an ethylene-vinyl acetate copolymer resin (HM221 of Cemedine Co., Ltd., softening point of 105° C.),
40% of a low molecular weight polyolefin (210 P of Mitsui Chemicals, Inc., melting point of 123° C.);
(Acrylic-Silicone Copolymer Particles)
10% of Chaline R-170S (Nissin Chemical Industry Co., Ltd., average particle diameter of 30 μm);
(Solid Lubricant)
5% of amorphous graphite (Blue P of Nippon Graphite Industries, Ltd., average particle diameter of 7 μm);
(Anticorrosive Agent)
5% of Ca ion exchanged silica (Sylysia 52Mo of Fuji Silysia Chemical, Ltd.).

A repeated makeup and breakout test of a tubular threaded joint was carried out at room temperature and at approximately −40° C. in the same manner as in Example 1. As shown in Table 1, in Comparative Example 1 in which a solid lubricating coating did not contain acrylic-silicone copolymer particles, the torque ratio at −40° C. was extremely high, whereas in Example 3 in which a solid lubricating coating contained acrylic-silicone copolymer particles, the torque level was approximately the same as when using compound grease both at room temperature and at −40° C. The adhesion of the coating was good. In addition, there was no occurrence of galling, and makeup and breakout could be performed ten times.

Rust preventing properties which are necessary for a tubular threaded joint were evaluated by forming the same solid lubricating coating as formed in Examples 1-3 on a box surface on a separately prepared coupon test piece of the same steel (70 mm×150 mm×2 mm thick) and subjecting each test piece to a humidity cabinet test (temperature of 50° C., relative humidity of 98%, duration of 200 hours). As a result, it was confirmed that there was no occurrence of rust in any of Examples 1-3.

Comparative Example 1

The pin surface and the box surface of the same tubular threaded joint made of carbon steel as used in Example 1 were subjected to the following surface treatment.

The pin surface which was finished by machine grinding (surface roughness of 3 μm) was immersed for 10 minutes in a zinc phosphating solution at 75-85° C. to form a zinc phosphate coating with a thickness of 8 μm (surface roughness of 8 μm). An ultraviolet curing resin coating composition prepared by adding 0.05 parts of aluminum phosphite as an anticorrosive agent and 0.01 parts of polyethylene wax as a lubricant to one part of the resin content of an acrylic resin-based ultraviolet curing resin paint made by Chugoku Marine Paint, Ltd was applied atop the zinc phosphate coating and was irradiated with ultraviolet light under the following conditions to cure the coating and form an ultraviolet cured resin coating having a thickness of 25 µm on the pin surface. The resulting solid corrosion-protecting coating was colorless and transparent, and the male threads of the pin could be inspected with the naked eye or with a magnifying glass from atop the coating.

UV lamp: Air-cooled mercury vapor lamp,
UV lamp output: 4 kW,
Wavelength of UV light: 260 nm.

The box surface which was finished by machine grinding (surface roughness of 3 µm) was subjected to electroplating first by Ni strike plating and then by Cu—Sn—Zn alloy plating to form a plated coating with a total thickness of 8 µm. A lubricating coating-forming composition having the following composition (not containing acrylic-silicone copolymer particles) was heated to 120° C. inside a tank having a stirring mechanism to obtain a molten state having a viscosity suitable for coating, and after the box surface which had undergone the above-described preparatory surface treatment was preheated to 120° C. by induction heating, the molten composition for forming a solid lubricating coating was applied to the preheated box surface using a spray gun having a spraying head with a temperature maintaining mechanism. After cooling, a solid lubricating coating with a thickness of 50 µm was formed.

Composition of the Lubricating Coating-Forming Composition
(Thermoplastic Polymer Matrix)
22.5% of a polyolefin resin (HM321 of Cemedine Co., Ltd., softening point of 130° C.),
22.5% of an ethylene-vinyl acetate copolymer resin (HM221 of Cemedine Co., Ltd., softening point of 105° C.),
45% of a low molecular weight polyolefin (210 P of Mitsui Chemicals, Inc., melting point of 123° C.);
(Solid Lubricant)
5% of amorphous graphite (Blue P of Nippon Graphite Industries, Ltd., average particle diameter of 7 µm),
(Anticorrosive Agent)
5% of Ca ion exchanged silica (Sylysia 52Mo of Fuji Silysia Chemical, Ltd.).

A repeated makeup and breakout test of a tubular threaded joint was carried out at room temperature and at approximately −40° C. in the same manner as in Example 1. As shown in Table 1, in Comparative Example 1 which did not contain acrylic-silicone copolymer particles, the torque ratio was high compared to Examples 1-3 even at 20° C., and the torque ratio was extremely high at −40° C. There were no problems with respect to the adhesion of the coating even at low temperatures, but galling occurred on the fifth makeup, and the test was terminated.

Comparative Example 2

The pin surface and the box surface of the same tubular threaded joint made of carbon steel as used in Example 1 were subjected to the following surface treatment.

The pin surface which was finished by machine grinding (surface roughness of 3 µm) was immersed for 10 minutes in a zinc phosphating solution at 75-85° C. to form a zinc phosphate coating with a thickness of 8 µm (surface roughness of 8 µm). An ultraviolet curing resin coating composition prepared by adding 0.05 parts of aluminum phosphite as an anticorrosive agent and 0.01 parts of polyethylene wax as a lubricant to one part of the resin content of an acrylic resin-based ultraviolet curing resin paint made by Chugoku Marine Paint, Ltd was applied atop the zinc phosphate coating and was irradiated with ultraviolet light under the following conditions to cure the coating and form an ultraviolet cured resin coating having a thickness of 25 µm on the pin surface. The resulting solid corrosion-protecting coating was colorless and transparent, and the male threads of the pin could be inspected with the naked eye or with a magnifying glass from atop the coating.

UV lamp: Air-cooled mercury vapor lamp,
UV lamp output: 4 kW,
Wavelength of UV light: 260 nm.

The box surface which was finished by machine grinding (surface roughness of 3 µm) was subjected to electroplating first by Ni strike plating and then by Cu—Sn—Zn alloy plating to form a plated coating with a total thickness of 8 µm. A lubricating coating-forming composition having the following composition was heated to 120° C. inside a tank having a stirring mechanism to obtain a molten state having a viscosity suitable for coating, and after the box surface which had undergone the above-described preparatory surface treatment was preheated to 120° C. by induction heating, the molten composition for forming a solid lubricating coating was applied to the preheated box surface using a spray gun having a spraying head with a temperature maintaining mechanism. After cooling, a solid lubricating coating with a thickness of 50 µm was formed.

Composition of the Lubricating Coating-Forming Composition
9% of a polyethylene homopolymer (Licowax™ PE 520 of Clariant Corporation),
15% of carnauba wax,
15% of zinc stearate,
5% of liquid polyalkyl methacrylate (Viscoplex™ 6-950 of Rohmax Corporation),
40% of a corrosion inhibitor (NA-SUL™ Ca/W1935 of King Industries Inc.),
3.5% of fluorinated graphite,
1% of zinc oxide,
5% of titanium dioxide,
5% of bismuth trioxide,
1% of silicone resin particles (KMP-590 of Nissin Chemical Industry Co., Ltd., average particle diameter of 2 µm),
Antioxidant (manufactured by Ciba-Geigy Corporation)
0.3% of Irganox™ L150,
0.2% of Irgafos™ 168.

A repeated makeup and breakout test of a tubular threaded joint was carried out at room temperature and at approximately −40° C. in the same manner as in Example 1. As shown in Table 1, the torque ratio at −40° C. in Comparative Example 2, in which a conventional hot melt type solid lubricating coating was formed on the box surface, was approximately 3 times as high as in Examples 1-3. Furthermore, peeling of the coating was observed at −40° C. Galling developed on the sixth makeup in the test, so the test was terminated.

TABLE 1

| No. | Number of cycles with no galling | | Shouldering torque ratio on 1st makeup cycle | | Breakout torque ratio on 1st makeup cycle | | Adhesion of lubricating coating | |
|---|---|---|---|---|---|---|---|---|
| | 20° C. | −40° C. | 20° C. | −40° C. | 20° C. | −40° C. | 20° C. | −40° C. |
| Ex. 1 | 10 | 10 | 102 | 107 | 105 | 101 | OK | OK |
| Ex. 2 | 10 | 10 | 114 | 120 | 120 | 104 | OK | OK |
| Ex. 3 | 10 | 10 | 97 | 103 | 100 | 98 | OK | OK |
| Com. 1 | 10 | 4 | 151 | 333 | 166 | 311 | OK | OK |
| Com. 2 | 10 | 5 | 118 | 393 | 128 | 329 | OK | much peeling |

The present invention was explained above with respect to embodiments which are currently thought to be preferred, but the present invention is not limited to the above disclosed embodiments. It is possible to make variations within a scope which is not contrary to the technical concept of the invention construed from the claims and the overall description, and a threaded joint which incorporates such changes should be understood as being encompassed by the technical scope of the present invention.

The invention claimed is:

1. A tubular threaded joint comprising a pin and a box each having contact surface including threads and an unthreaded metal contact portion, characterized in that the contact surface of at least one of the pin and the box has a thermoplastic solid lubricating coating formed as an uppermost surface treatment coating layer, said thermoplastic solid lubricating coating containing particles of a copolymer of a resin selected from a silicone resin and a fluorocarbon resin with a different thermoplastic resin in a thermoplastic polymer matrix.

2. A tubular threaded joint as set forth in claim 1 wherein the thermoplastic solid lubricating coating is formed on the contact surface of one of the pin and the box, and the contact surface of the other of the pin and the box has a solid corrosion-protecting coating based on an ultraviolet curing resin as an uppermost surface treatment coating layer.

3. A tubular threaded joint as set forth in claim 1 wherein the particles of a copolymer are acrylic-silicone copolymer particles.

4. A tubular threaded joint as set forth in claim 3 wherein the acrylic-silicone copolymer particles are spherical particles having an average particle diameter of 10-40 µm, and their content in the coating is 0.5-30 mass %.

5. A tubular threaded joint as set forth in claim 1 wherein the thermoplastic polymer matrix comprises one or more resins selected from a polyolefin resin and an ethylene-vinyl acetate copolymer resin.

6. A tubular threaded joint as set forth in claim 1 wherein the thermoplastic solid lubricating coating further contains a solid lubricant.

7. A threaded joint as set forth in claim 6 wherein the solid lubricant is graphite.

8. A tubular threaded joint as set forth in claim 1 wherein the thickness of the thermoplastic solid lubricating coating is 10-200 µm.

9. A tubular threaded joint as set forth in claim 2 wherein the thickness of the solid corrosion-protecting coating is 5-50 µm.

10. A connection for oil country tubular goods comprising a tubular threaded joint as set forth in claim 1.

11. A composition for forming a thermoplastic solid lubricating coating on a tubular threaded joint characterized by comprising (1) a thermoplastic polymer matrix material, and (2) particles of a copolymer of a resin selected from a silicone resin and a fluorocarbon resin with a different thermoplastic resin.

12. A composition as set forth in claim 11 wherein the particles of a copolymer are acrylic-silicone copolymer particles.

13. A composition as set forth in claim 12 wherein the acrylic-silicone copolymer particles are spherical particles having an average particle diameter of 10-40 µm and their content is 0.5-30 mass % of the total solids content of the composition.

14. A composition as set forth in claim 11 wherein the thermoplastic polymer matrix material is one or more resins selected from a polyolefin resin and an ethylene-vinyl acetate copolymer resin.

15. A composition as set forth in claim 11 further containing a solid lubricant.

16. A composition as set forth in claim 15 wherein the solid lubricant is graphite.

17. A method of manufacturing a tubular threaded joint having a surface treatment coating layer, said tubular threaded joint comprising a pin and a box each having a contact surface including threads and an unthreaded metal contact portion, characterized by forming a solid lubricating coating as an uppermost surface treatment coating layer on the contact surface of at least one of the pin and box by application of a composition as set forth in claim 11 in which the thermoplastic polymer matrix material is in molten state followed by cooling.

18. A method as set forth in claim 17 wherein the solid lubricating coating is formed on the contact surface of one member of the pin and the box, and a solid corrosion-protecting coating is formed on the contact surface of the other member of the pin and the box as an uppermost surface treatment coating layer by application of a composition based on an ultraviolet curing resin followed by irradiation with ultraviolet light.

* * * * *